United States Patent
Bassov (10) Patent No.: US 10,146,780 B1
(45) Date of Patent: Dec. 4, 2018

(54) DATA STORAGE SYSTEM USING PACED DEALLOCATION OF TRUNCATED FILE BLOCKS

(71) Applicant: EMC Corporation, Hopkinton, MA (US)

(72) Inventor: Ivan Bassov, Brookline, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 316 days.

(21) Appl. No.: 15/078,672

(22) Filed: Mar. 23, 2016

(51) Int. Cl.
*G06F 17/00* (2006.01)
*G06F 17/30* (2006.01)

(52) U.S. Cl.
CPC .. *G06F 17/30082* (2013.01); *G06F 17/30138* (2013.01)

(58) Field of Classification Search
None
See application file for complete search history.

(56) References Cited

U.S. PATENT DOCUMENTS

| | | | |
|---|---|---|---|
| 6,571,259 B1 | 5/2003 | Zheng et al. | |
| 6,985,976 B1 * | 1/2006 | Zandonadi | G06F 12/023 707/999.2 |
| 7,379,954 B2 * | 5/2008 | Shoens | G06F 17/30088 |
| 7,631,155 B1 * | 12/2009 | Bono | G06F 3/0608 707/999.202 |
| 7,873,619 B1 | 1/2011 | Faibish et al. | |
| 8,090,905 B2 * | 1/2012 | Stenfort | G06F 3/0605 711/103 |
| 8,285,758 B1 * | 10/2012 | Bono | G06F 17/30079 707/822 |
| 9,052,825 B2 * | 6/2015 | Vaghani | G06F 3/064 |
| 9,454,473 B2 * | 9/2016 | Luan | G06F 12/023 |
| 2009/0006496 A1 * | 1/2009 | Shoens | G06F 17/3023 |
| 2010/0179959 A1 * | 7/2010 | Shoens | G06F 17/30088 707/758 |
| 2010/0250829 A1 * | 9/2010 | Stenfort | G06F 12/023 711/103 |
| 2010/0251009 A1 * | 9/2010 | Stenfort | G06F 3/0605 714/5.1 |
| 2012/0016883 A1 * | 1/2012 | Nandy | G06F 17/3033 707/747 |
| 2012/0084492 A1 * | 4/2012 | Stenfort | G06F 3/0605 711/103 |
| 2012/0265920 A1 * | 10/2012 | Baron | G06F 12/0253 711/6 |

* cited by examiner

*Primary Examiner* — Hung D Le
(74) *Attorney, Agent, or Firm* — BainwoodHuang (57) ABSTRACT

In a data storage system an internal file system stores client storage objects as respective files. A count of actual free space includes blocks available for allocation to store new file data, and a count of reported free space includes the actual free space as well as blocks of recently deleted file data undergoing deallocation. The reported free space count is used to initiate file system operations requiring allocation of free space, while the actual free space count is used to continue initiated file system operations based on availability of actual free space. Upon a truncation, a reporting update estimates or counts a number of blocks to be freed and adds the number to the reported free space count, and a background update is initiated to deallocate truncated blocks at a paced rate and update the actual free space count as blocks are deallocated.

21 Claims, 6 Drawing Sheets

DATA STORAGE SYSTEM USING PACED DEALLOCATION OF TRUNCATED FILE BLOCKS

BACKGROUND

The present invention relates to the field of data storage systems, and in particular to data storage systems employing internal file systems for storing storage object data.

Certain types of data storage systems employ internal file systems for storing the data of storage objects that are presented to external storage system users, such as applications executing on separate host computers, etc. In one example, a storage system stores a logical unit of storage or LUN as a file of an internal file system. The use of a file system can support a variety of value-added functionality, including for example point-in-time copying of LUNs to create snapshots or "snaps". Snaps can be created as additional files of the file system, specifically by duplicating the primary file metadata for the LUN and pointing to now-shared copies of the blocks of the primary file. As the LUN continues to evolve during production operation, the primary file contents change by addition of new blocks and/or removal of blocks, and the storage system dynamically maintains both the file system metadata and the underlying data blocks to faithfully represent both the evolving LUN as well as any existing snaps. Both the primary file and the snap files may be subject to size reduction, referred to as "truncation", as well as complete deletion. It will be appreciated that individual files may be quite large given that they store respective LUNs, each of which may have a size anywhere in a range from megabytes to gigabytes to terabytes and beyond.

SUMMARY

File/snap delete and truncate operations normally result in a large spike of internal I/O updating various metadata records, which can negatively impact client operations and overall system performance. Delete and truncate operations are done in the background, as they may take a very long time (e.g., hours) to complete depending on the amount of data being deleted. In prior systems the delete and truncate operations are given relatively high priority so that blocks being freed by those operations are added to the free space as they are being deallocated, and thus become available to file system users as soon as possible. This results in spikes of overloading the system when these background operations are running. In the presently disclosed system, the background truncate and delete operations are throttled or "paced", spreading their I/Os over time and smoothing the impact on system performance and client operations. The pacing can be overridden if it should become necessary to obtain freed blocks as soon as possible, e.g., because a new I/O requires newly allocated space beyond what is currently available.

In particular, a method is disclosed of operating a data storage system that includes operating an internal file system using physical storage devices of the data storage system for underlying data storage. The internal file system stores client storage objects as respective files of the file system. The file system includes allocated space occupied by existing file data and free space available for storing new file data. Operation includes maintaining respective counts of actual free space and reported free space of the file system, the actual free space including blocks currently available for allocation to store new file data, the reported free space including the actual free space as well as blocks of recently deleted file data undergoing deallocation. The count of reported free space is used to initiate file system operations requiring allocation of free space, while the count of actual free space is used to continue initiated file system operations based on availability of actual free space. Upon truncation of a file, a reporting update is performed and a background update is initiated. The reporting update estimates a number of blocks to be freed by the truncation and adds the estimated number to the reported free space for use in initiating subsequent file system operations requiring allocation of free space. The background update deallocates truncated blocks of the file and updates the count of actual free space as the truncated blocks are deallocated. The background update is performed at a paced rate permitting initiation of new file system operations before all the truncated blocks have been deallocated.

As indicated, the pacing of the background update spreads the respective I/O operations (primarily metadata updates) over time and smooths the impact on system performance and client operations. The pacing can be overridden if it should become necessary to obtain freed blocks as soon as possible, e.g., because a new I/O requires newly allocated space beyond what is currently available.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
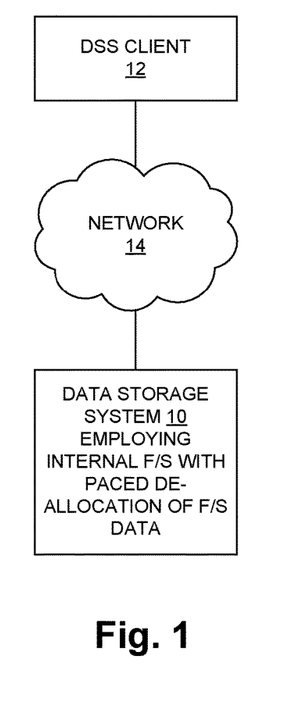
FIG. 1 is a block diagram of a computer system.

FIG. 1 shows a computer system having a data storage system 10 coupled to one or more data storage system (DSS) clients 12 by a network 14. In a typical case a DSS client 12 is a host computer such as a server computer executing one or more application programs (applications) for which the secondary storage (block or file) is maintained by the data storage system 10, with the network 12 conveying data storage requests and responses, as well as associated data. For example, a DSS client 12 performs a write operation to a block-oriented storage device by issuing a write request that specifies the device, the starting logical address, and the length, as well as the associated write data. The network 12 conveys the write request and write data to the data storage system 10, which stores the write data on the identified device beginning at the specified logical address. A DSS client 12 performs a read operation to a block-oriented device by issuing a read request that specifies the device, the starting logical address, and the length. The network 12 conveys the read request to the data storage system 10, which obtains the data from the specified device beginning at the specified logical address and returns the data to the DSS client 12 via the network 14. As explained more below, the data storage system 10 may present storage resources to the DSS clients 12 in alternative ways, such as in the form of a network-level or distributed file system, as logical storage units or LUNs, or as virtual volumes or similar virtualized storage containers that are understood by DSS clients 12 hosting virtual machines, such as ESX® hosts (servers) or XEN® hosts (servers).

In the description below, the terms "host" and "host computer" should be understood as referring to a DSS client 12.

As indicated at 10, the data storage system 10 employs one or more internal file systems for managing the use of storage resources, along with a technique of pacing the background deallocation of deleted file data. This technique provides certain advantages in operation as is explained more below.

Figure 2:
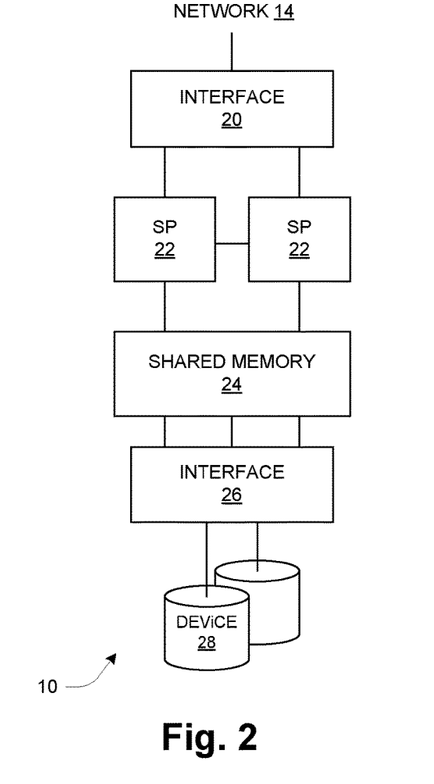
FIG. 2 is a hardware-oriented block diagram of a data storage system.

FIG. 2 is a block diagram of the data storage system 10 from a hardware perspective. It includes an interface 20 to the network 14, a pair of storage processors (SPs) 22, shared memory 24, and an interface 26 to physical secondary storage devices (DEVICE) 28, such as magnetic disks, Flash drives, etc. The interface 20 may include one or more network adapters such as a FibreChannel adapter, Gigabit Ethernet adapter, etc., and the interface 26 may similarly include storage-oriented adapters such as FibreChannel adapters etc. Each storage processor 22 executes software causing the storage processor 22 to present logical or virtualized storage resources to the network 14 and DSS clients 12, employing the devices 28 for the underlying physical storage. The logical or virtualized storage resources may include either or both block-oriented devices (e.g., logical storage units (LUNs), virtual volumes (VVOLS), etc.) and/or client-visible file systems (e.g., NFS, CIFS, etc.) The shared memory 24 may be used for one or more device caches, also referred to as a "storage cache", for caching data of the devices 28. Further details of the structure and operation of the data storage system 10 are provided below.

Figure 3:
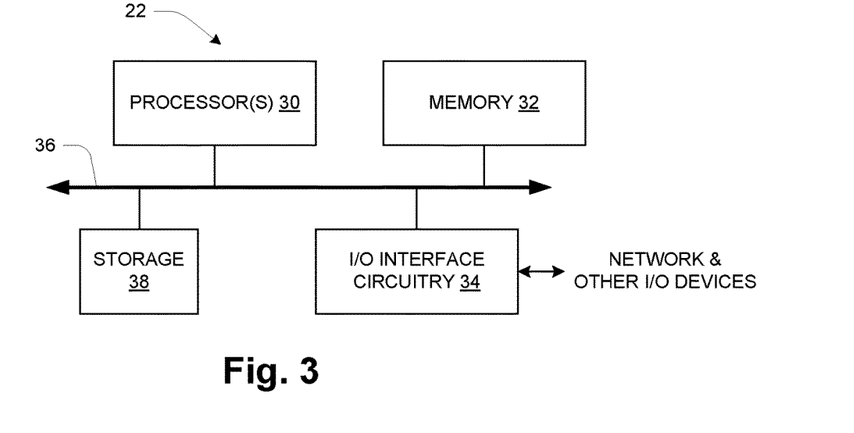
FIG. 3 is a hardware-oriented block diagram of a storage processor.

FIG. 3 shows an example configuration of a storage processor 22 from a computer hardware perspective. The hardware includes one or more processors 30, memory 32, and interface circuitry 34 interconnected together by data interconnections 36 such as one or more high-speed data buses. The interface circuitry 34 provides a hardware connections to the shared memory 24 and interfaces 20, 26 (FIG. 2) and perhaps other external devices/connections (EXT DEVs). The processor(s) 30 with connected memory 32 may also be referred to as "processing circuitry" herein. A storage processor 22 may also have its own local secondary storage 38 such as a Flash memory array. In operation, the memory 32 stores data and instructions of system software (e.g., operating system) and one or more application programs which are executed by the processor(s) 30 to cause the hardware to function in a software-defined manner. Thus the computer hardware executing instructions of a data storage application, such as described herein, can be referred to as a data storage circuit or data storage component, and it will be understood that a collection of such circuits or components can all be realized and interact with each other as one or more sets of computer processing hardware executing different computer programs as generally known in the art.

Figure 4:
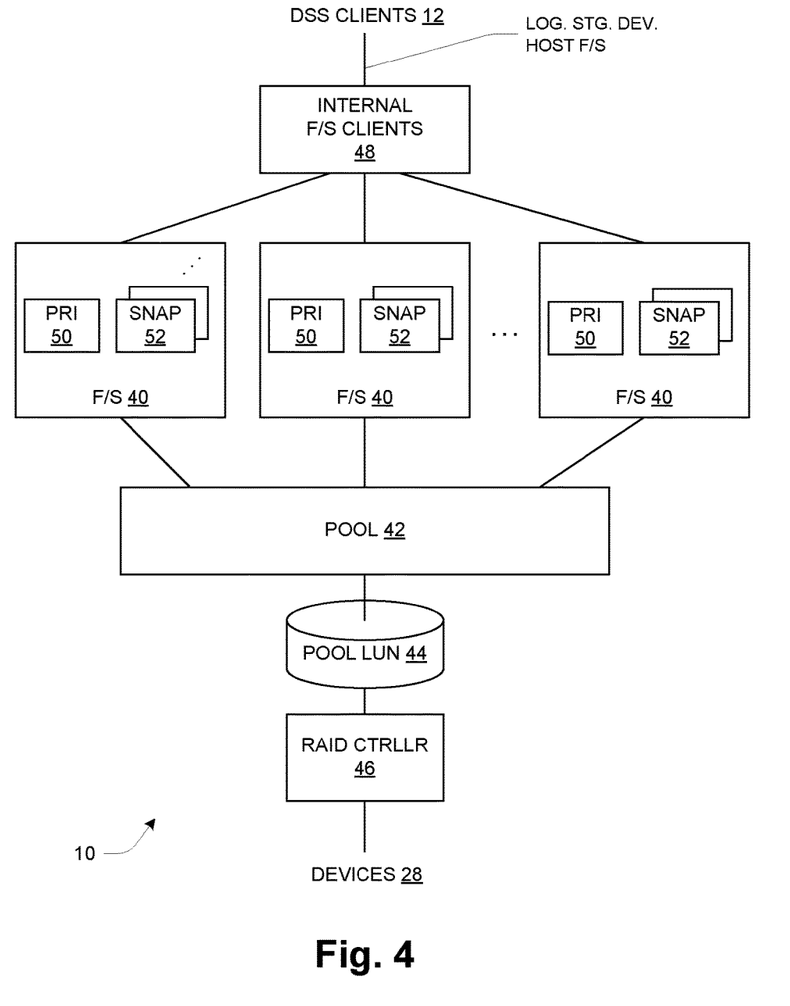
FIG. 4 is a functional block diagram of a data storage system.

FIG. 4 is a functional block diagram of the data storage system 10, the functional blocks generally being realized by execution of computer program instructions by the storage processor hardware as shown in FIG. 3. This description focuses on certain aspects of the functional structure and operation, specifically the use of one or more internal file systems (F/S) 40 which draw their underlying physical storage from the devices 28 via a certain organization as shown. This organization includes a pool 42 of data units, referred to as "slices", that are carved from an internal logical storage unit called a "pool LUN" 44, which in turn is presented by a RAID controller 46 implementing RAID over sets of the devices 28. Thus in general there may be a one-to-multiple mapping between the pool LUN 44 and corresponding devices 28 providing the RAID-protected underlying physical storage.

The internal file systems 40 are utilized by one or more internal file system clients 48 that present storage resources to the DSS clients 12. Examples of such presented resources include a logical storage device and a host file system as shown. In one embodiment, a logical storage device is mapped to a file of a file system 40. The data storage system 10 may support point-in-time copying of device data, with the copies being referred to as "snapshots" or "snaps". In this case, the device being copied may be referred to as the "primary" object and its snaps as "secondary" objects, and a given file system 40 hosts both the primary object as well as all its snaps. A primary object is stored in a primary file 50, and secondary objects or snaps are stored in respective distinct secondary or snap files 52 of the given file system 40.

Figure 5:
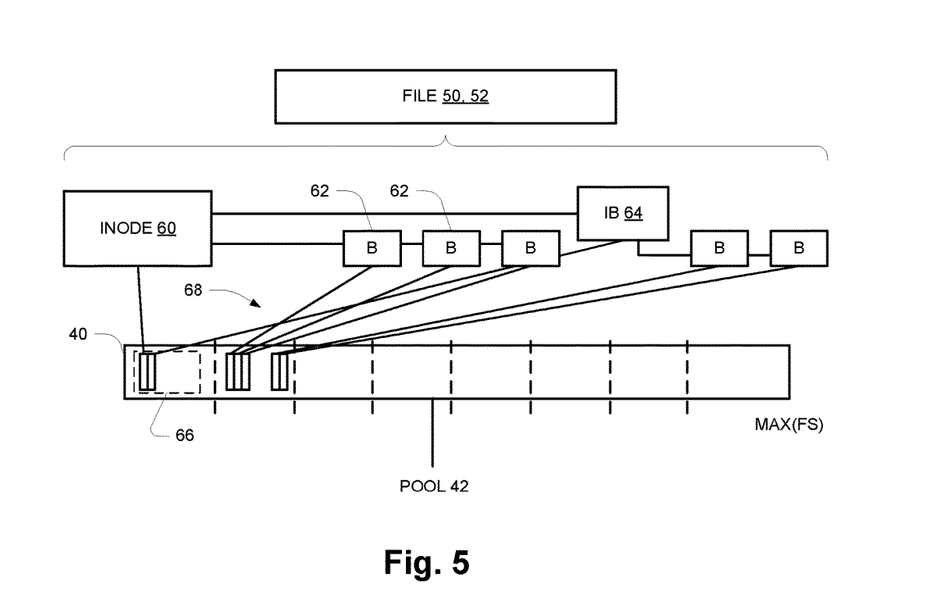
FIG. 5 is a schematic diagram of the structure of a file and its relation to a file system.

FIG. 5 illustrates certain details regarding files and file systems. A file 50, 52 is shown as including an Inode 60 and a set of data blocks (B) 62. An indirect block (IB) 64 is also shown. All these items are included in the respective file system 40, which in general will contain multiple files. Thus, the Inode 60 is part of an Inode structure 66 that generally includes Inodes of other files (not shown) as well as the indirect blocks 64. Also shown in FIG. 5 is the relationship of the file 50, 52 to the respective file system 40. Each file system 40 may be viewed as occupying a large linear space and has a respective maximum size (as may be specified in blocks or bytes, for example) shown as Max(FS). At any given time there is an allocated size corresponding to the amount of underlying storage that is actually allocated for use by the file system 40.

The Inode 60 contains direct pointers to some number of blocks 62 where file data is stored. If the file is sufficiently large, then one or more indirect blocks 64 are used. The Inode 60 contains pointers to the indirect block(s) 64, which in turn include pointers to additional data blocks 62. In typical file systems there may be at most three levels of indirection. In the description below, the term "IB tree" is used to refer to the entire set of IBs 64 and the Inode 60 for a given file. The IB tree establishes a mapping 68 from a logical linear arrangement of blocks 62 of a file 50, 52 to corresponding block locations in the address space of the file system 40. In general this mapping may be arbitrary, i.e., neither ordering nor adjacencies of blocks need to be preserved, and for such arbitrary mappings it is necessary to traverse the IB tree to locate a block in the file system 40 based on an address of the block in the corresponding file 50, 52. In some cases a "direct mode" of operating may be used in which the mapping is constrained in a manner that enables block locations to be identified by calculation rather than by traversing the IB tree. In particular, block ordering is preserved, and block adjacencies are preserved within individual groups. Calculation is generally much faster than IB tree traversal, and thus direct mode operation can provide improved file system performance.

Figure 6:
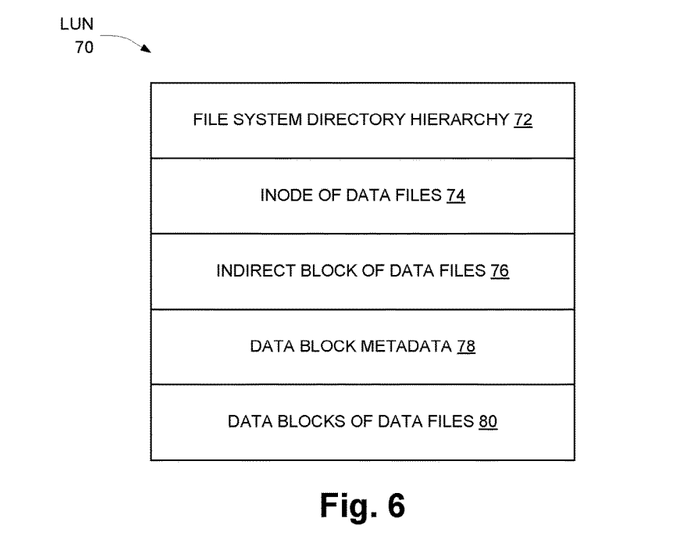
FIGS. 6-8 are schematic depictions of data structures.

FIG. 6 shows a logical representation of a LUN 70 presented to a host and organized as a file system 40 that may be included in an embodiment using the techniques herein. A user of data storage system 10 accesses data from LUNs 70 stored on storage devices 28 in fixed sized chunks referred to as "slices". One or more slices are grouped together to create a slice pool 44. A host 12 provisions storage from the slice pool 44 for creating LUNs 70. A LUN 70 is visible to the host 12 and a user of a data storage system 10. Typically, storage is allocated when a host 12 issues a write request and a new data block is needed to write user data.

File systems typically include metadata describing attributes of a file system and data from a user of the file system. A file system contains a range of file system blocks that store metadata and data. A file system mapping driver allocates file system blocks from slices of storage for creating files and storing metadata of a file system. In at least some embodiments of the current technique, the file system block may be 8 kilobyte (KB) in size. Further, a user of data storage system 10 creates files 50, 52 in a file system 40. The file system 40 is organized as a hierarchy. At the top of the hierarchy is a listing of the directories 72 in the file system. Inodes of data files 74 depend from the file system directory hierarchy 72. Indirect blocks of data files 76 depend from the Inodes of the data files 74. Data block metadata 78 and data blocks of data files 80 depend from the Inodes of data files 74 and from the indirect blocks of data files 76.

Figure 7:
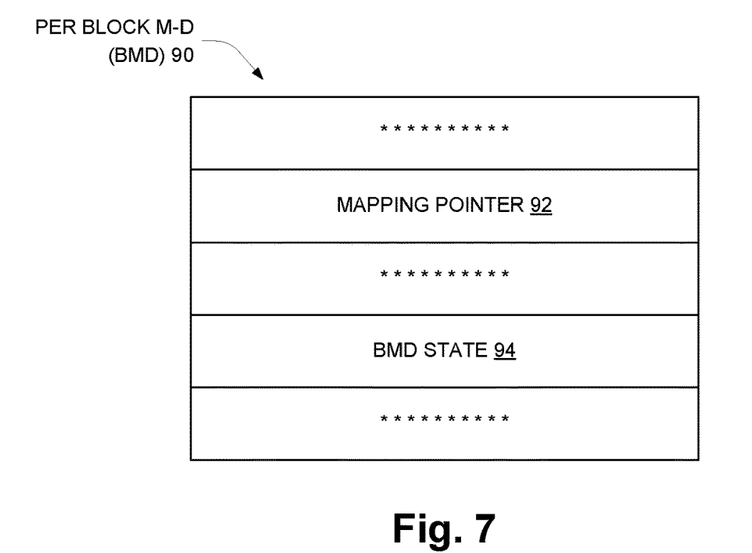

FIG. 7 shows a representation of a per block metadata (also referred to as "BMD") 90 for a file system data block that may be included in an embodiment using the techniques described herein. The per-block metadata 90 for a file system data block includes an inode number of a file of the file system, the file system data block number and the logical offset of the file system data block, which are not shown. The per-block metadata 90 for a file system data block also includes an internal checksum (also not shown) protecting the integrity of the information stored in the per-block metadata 90. The per-block metadata for a file system data block may further include a mapping pointer 92 and a data structure indicating state of the per-block metadata, shown as BMD STATE 94.

Figure 8:
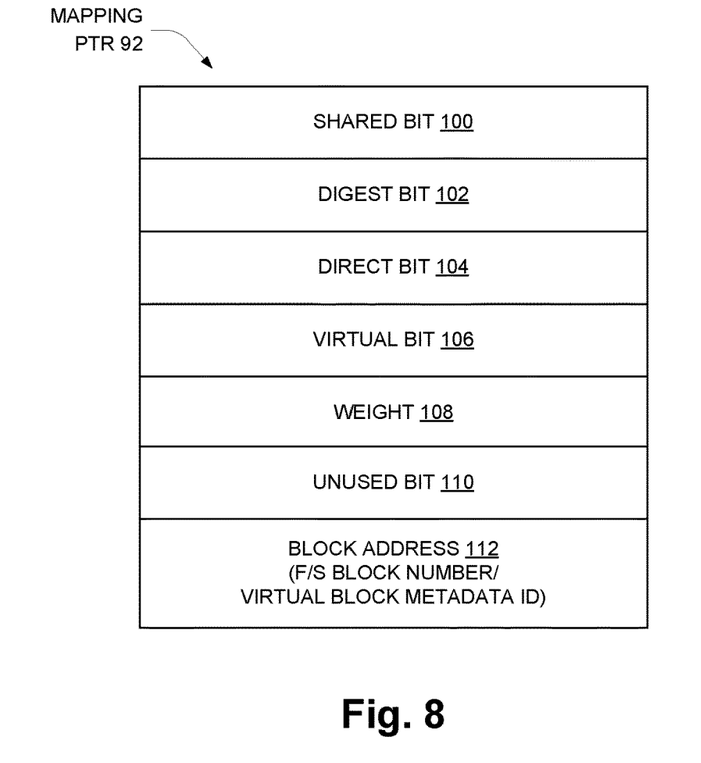

FIG. 8 shows a representation of a mapping pointer 92 of a file system data block that may be included in an embodiment using the techniques described herein. Each file system data block of a file is associated with a respective mapping pointer. A mapping pointer of a file system block points to the file system block and includes metadata information for the file system block. A file system block associated with a mapping pointer may be a data block or an indirect block which in turn points to other data blocks or indirect blocks. A mapping pointer includes information that help map a logical offset of a file system block to a corresponding physical block address of the file system block. Mapping pointer 92 includes metadata information such as a shared bit 100, a digest bit 102, a direct bit 104, a virtual bit 106, weight 108, an unused bit 110 and a block address 112. The shared bit 100 of mapping pointer 92 associated with a file system data block indicates whether the data block (or data blocks if the mapping pointer is associated with an indirect block) may be shared. The digest bit 102 of mapping pointer 92 for a file system block indicates whether the file system block has been digested by a deduplication engine. The direct bit 104 of mapping pointer 92 for a file system block indicates whether the physical address of the file system block can be computed algorithmically. The virtual bit 106 of mapping pointer 92 for a file system block indicates whether the mapping pointer is a virtual pointer. The weight 108 of mapping pointer 92 for a file system block indicates a delegated reference count for the mapping pointer 92. The delegated reference count is used by a snapshot copy facility when a replica of a file is created. Mapping pointers of the inode of the file are copied and included in the inode of the replica of the file.

In at least one embodiment, mapping pointers of the inode may include mapping pointers pointing to direct data blocks and mapping pointers pointing to indirect blocks. Then, the delegated reference count values stored in the mapping pointers of the file and the replica of the file are updated to indicate that the file and the replica of the file share data blocks of the file. Unused bit 110 of mapping pointer 92 for a file system block indicates an unused space reserved for a future use. Block address 112 of mapping pointer 92 for a file system block indicates the block number of the file system block. Alternatively, block address 112 of mapping pointer 92 may indicate a Virtual Block Metadata ("VBM") identification number which points to a VBM object that points to a data block and includes metadata for the data block. Thus, the VBM identifier is used to find an object including virtual block metadata. Thus, a VBM object includes file system data block mapping pointer. It also includes a total distributed weight for the VBM object which is the sum of weights of each mapping pointer for a file system block pointing to the VBM object. The VBM object may further includes a mapping pointer which may point to a file system block or another VBM object such that the mapping pointer includes the distributed weight for the mapping pointer.

In response to a request by a client of a storage system to create a snapshot copy of a production file, a virtual block mapping pointer is created that provides a mapping information to a logical block storing data of the file system block of the production file. The file system block includes a pointer pointing back to the metadata of the virtual block mapping pointer. Thus, a new kind of block pointer called virtual block mapping (VBM) pointer enables a migration or re-organization of data blocks to be performed in a non-disruptive fashion that is transparent to a file system manager because pointers to logical data blocks may be changed dynamically without having to change block pointers in inodes and indirect blocks pointing to the data blocks.

When a snapshot copy of a file is deleted, a portion of the file is truncated, or a portion of a snapshot copy of the file is truncated, each indirect block in a file system block hierarchy corresponding to a portion of a file or a snapshot copy of the file which is being deleted or truncated is evaluated such that a sibling indirect data block is determined for each indirect data block from file system hierarchies of snapshot copies of the file included in a version set to which the file belongs such that the indirect data block and the sibling indirect data block shares the most data blocks compared to other indirect data blocks in the file system hierarchies. Upon finding a sibling indirect data block for an indirect data block that has been selected for deletion, reference count for each shared data block pointed to by the indirect data block is returned to corresponding shared data block mapping pointer included in the sibling indirect data block instead of updating per-block metadata of each shared data block. It should be noted that an indirect data block may be selected from a file system hierarchy of a file when the file is deleted, the file is truncated, zeros are written to a portion of the file (also referred to as "punching a hole"), or data blocks are freed and returned to a storage device. Returning weight value for each shared data block pointed to by an indirect data block of a file to reference count values in a sibling indirect data block may also be referred to as "reverse indirect block split" operation as it operates in an opposite manner to a write split operation described above herein.

Generally, a delete or truncate operation for a file and/or snap of the file traverses a file system hierarchy for the file or the snap of the file in a top-down manner such that each indirect data block included in such file system hierarchy is traversed until each file system data block in each leaf indirect data block is evaluated. The processing of a leaf indirect data block includes processing each file system data block of the leaf indirect block where sharing status of each file system data block is evaluated. If a file system block of a snap processed for deletion is no longer referenced by any other active snaps, the file system block is deallocated and storage space associated with the file system block is freed. However, if a file system block of a snap processed for deletion is referenced by other active snaps, the file system block is not freed but metadata (e.g., delegated reference count) associated with the file system block is updated to decrement the reference to the file system data block.

Generally, the total distributed reference count value of a file system data block and a sharing status is maintained in per-block metadata of the file system data block. Typically, per-block metadata of a file system data block is either read from a cache or retrieved from a storage device if it does not reside in the cache to evaluate the sharing status of the file system data block. Further, in such a system, the delegated reference count value included in a mapping pointer of a file system data block is compared with the total distributed reference count value ("weight") stored in the per-block metadata.

In at least one embodiment of the current technique, sharing status of each file system data block included in a portion of file identified for deletion is evaluated to determine whether the file system data block can be freed if no other active snap refers to the file system data block. Upon determining that a file system block is "owned" indicating that the file system data block has not been shared by any other active snap and is only referenced by the file selected for deletion, the file system block may be deallocated and storage space associated with the file system data block may be reclaimed as free storage. Such file system block may also be referred to herein as uniquely allocated file system block. However, upon determining that a file system data block is "shared" indicating that the file system data block is either shared by more than one snap where one of the snap may not have been selected for deletion, the reference to the file system data is decremented by using the delegating reference counting mechanism described above herein.

Figure 9:
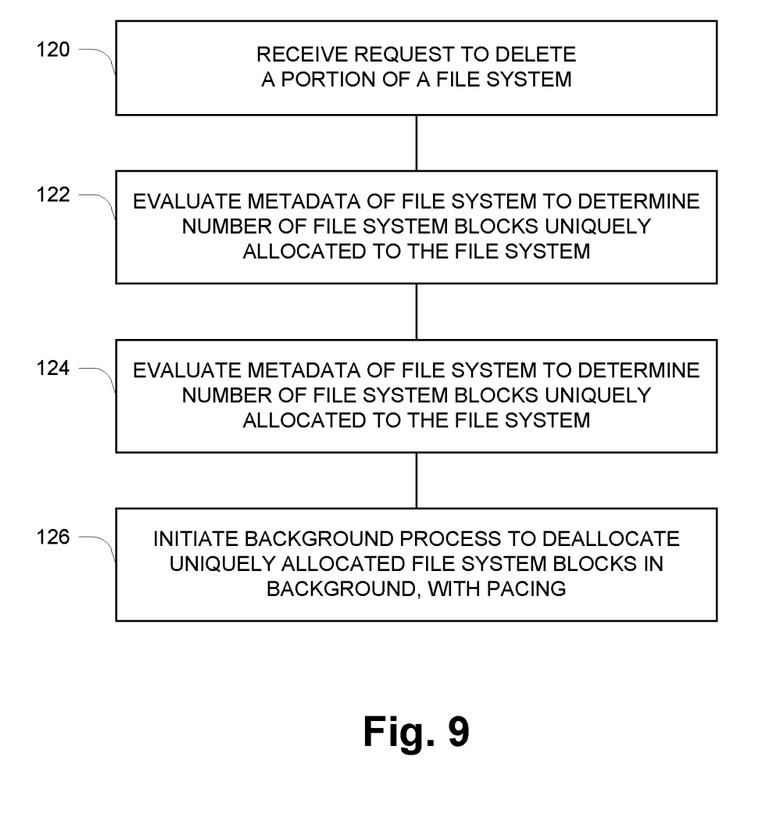
FIG. 9 is a flow diagram of a process of deleting a portion of a file system.

FIG. 9 illustrates a flow of operation of the data storage system 10, in particular operation in connection with a file delete or a file truncate operation performed on a file. A file delete operation deletes the entire contents of a file, while a file truncate operation reduces the size of the file by deleting a portion of the file. A file delete may be viewed as a special case of a file truncation, i.e., one in which the file is truncated to a new size of zero.

Upon receiving a request to either delete a file or truncate a file by deleting a portion of the file (step 120), metadata of the file is evaluated to determine the number of file system blocks that are uniquely allocated to the file indicating that such file system blocks are not shared with any snaps of the file and thus can be deallocated (step 122). Storage space associated with such uniquely allocated file system blocks is reported to a user of the file as available storage space in the file indicating that such storage space is available for use by the user (step 124). This is also referred to as a "reporting update". The file system blocks included in the portion of the file identified for truncation are deleted by using delegated reference count mechanism described above herein which includes updating metadata of file system blocks included in the portion of the file. At 126, a background update process is initiated to deallocate the uniquely allocated file system blocks asynchronously.

The reporting update at step 124 could be performed either in the foreground or background, and if in the background if preferably runs faster and ahead of the background update that deallocates blocks (step 126). In addition, the reporting update may not only estimate the number of blocks, but may actually count the exact number of blocks to be deallocated.

File/snap delete and truncate operations normally result in a large spike of internal I/O updating various metadata records, which can negatively impact client operations and overall system performance. Delete and truncate operations are done in the background, as indicated above, as they may take a very long time (e.g., hours) to complete. However, in prior systems the delete and truncate operations are given relatively high priority so that blocks being freed by those operations are added to the free space as they are being deallocated, and thus available to file system users as soon as possible. This results in spikes of overloading the system when these background operations are running. In the presently disclosed system, the background truncate and delete operations are throttled or "paced", spreading their I/Os over time and smoothing the impact on system performance and client operations. The pacing can be overridden if it should become necessary to obtain freed blocks as soon as possible, e.g., because a new I/O requires newly allocated space beyond what is currently available.

Figure 10:
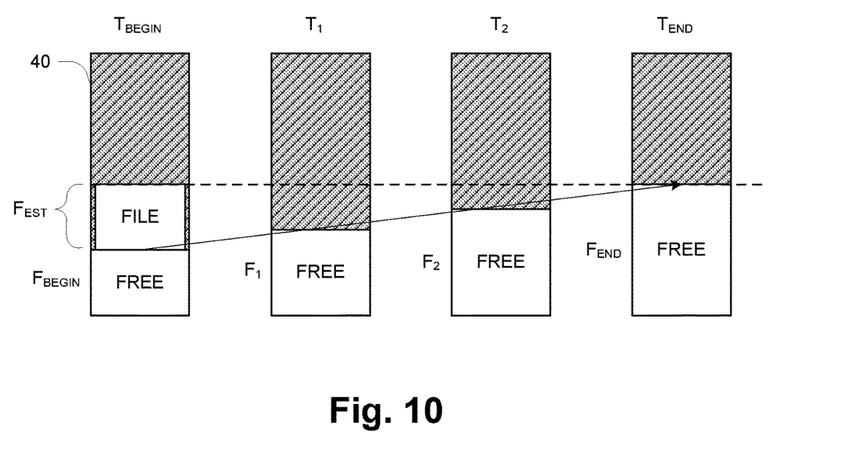
FIGS. 10-11 are schematic depictions of a file system upon deletion of a portion thereof in two different scenarios.
Figure 11:
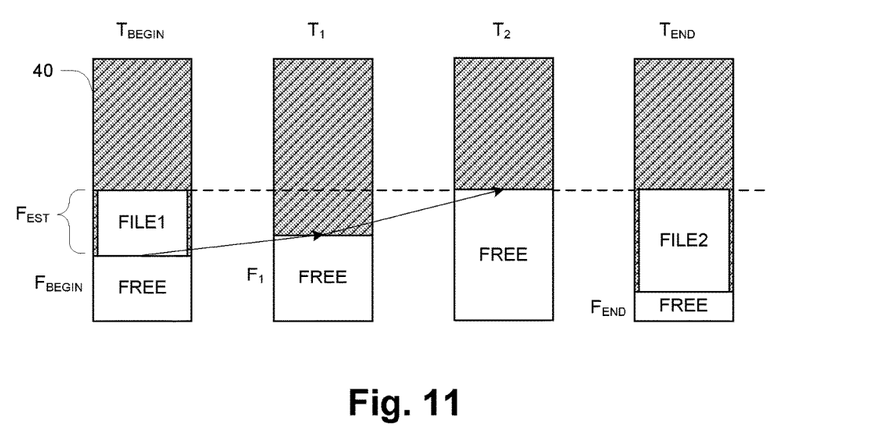

FIGS. 10 and 11 illustrate the above operation. FIG. 10 shows a first example in which demand for new allocations is generally less than actual free space, meaning that the background deallocation can proceed in the throttled or paced manner. FIG. 11 shows a second example in which demand for new allocations is higher than actual free space, requiring acceleration or de-pacing of the background deallocation to avoid unnecessarily delaying completion of the I/O that requires the new allocation.

More particularly, FIG. 10 shows the state of the file system 40 over a period from $T_{BEGIN}$ through $T_1$ and $T_2$ to $T_{END}$. At $T_{BEGIN}$, there is an initial amount of free space indicated by $F_{BEGIN}$. A file FILE occupies a certain amount of space, and that file is truncated or deleted. As outlined above, the amount of space to be freed can be estimated by counting the number of blocks being deleted that are uniquely allocated to the file. This quantity is indicated as $F_{EST}$. At this time, the actual free space is $F_{BEGIN}$, but the reported free space is the sum $F_{BEGIN}+F_{EST}$. The background deallocation process is also initiated at $T_{BEGIN}$. The deleted blocks are deallocated and returned to the free space in a paced manner, i.e., at a selected rate generally much less than the maximum possible rate that could be used based on available device bandwidth, etc. This pacing smooths out the impact of the deallocation operations on ongoing user I/O, as described above. In the simplified example of FIG. 10, the pacing causes the space to be reclaimed over the period stretching from $T_{BEGIN}$ to $T_{END}$. It can be seen that the amount of free space gradually grows from $F_{BEGIN}$ to $F_1$, $F_2$ and finally $F_{END}$.

FIG. 11 uses a similar presentation to describe a different scenario, one in which the deleted space is needed before the regular pacing would make it available. In this case the background process is accelerated or de-paced to free up the space more quickly, enabling its use to satisfy one or more new I/Os. Operation is the same until time T1, at which time it is assumed that a new I/O is received that is writing a new file FILE2 whose size is greater than the amount $F_1$ that is free at time $T_1$. The background process is then de-paced, so that the entire remaining deleted portion becomes available more quickly, which is shown as time $T_2$ in this example. Once this has occurred, the new file FILE2 is written into the free space at time $T_{END}$, leaving a remainder of free space $F_{END}$.

Any of several heuristics may be used for pacing the background deallocation. Factors that can be taken into account include CPU utilization, I/O latency, number of client I/Os, etc.

While various embodiments of the invention have been particularly shown and described, it will be understood by those skilled in the art that various changes in form and details may be made therein without departing from the spirit and scope of the invention as defined by the appended claims.

What is claimed is:

1. A method of operating a data storage system, comprising:
    operating an internal file system using physical storage devices of the data storage system for underlying data storage, the internal file system storing client storage objects as respective files of the file system, the file system including allocated space occupied by existing file data and free space available for storing new file data;
    maintaining respective counts of actual free space and reported free space of the file system, the actual free space including blocks currently available for allocation to store new file data, the reported free space including the actual free space as well as blocks of recently deleted file data undergoing deallocation, the count of reported free space being used to initiate file system operations requiring allocation of free space, the count of actual free space being used to continue initiated file system operations based on availability of actual free space; and
    upon truncation of a file, performing a reporting update and initiating a background update, the reporting update either estimating or counting a number of blocks to be freed by the truncation and adding the number to the reported free space for use in initiating subsequent file system operations requiring allocation of free space, the background update deallocating truncated blocks of the file and updating the count of actual free space as the truncated blocks are deallocated, the background update being performed at a paced rate permitting initiation of new file system operations before all the truncated blocks have been deallocated.

2. The method of claim 1, further including, during an initiated file system operation requiring allocation of an amount of free space greater than the actual free space, (i) temporarily suspending the file system operation and de-pacing the background update to hasten the deallocation of the truncated blocks, and (ii) upon the count of actual free space reaching a desired higher value by the deallocation of the truncated blocks, resuming the file system operation.

3. The method of claim 1, wherein the file system includes files storing snapshots of the file being truncated, and wherein estimating a number of blocks to be freed by the truncation includes evaluating metadata of the file to determine the number of file system blocks that are uniquely allocated to the file, indicating that such file system blocks are not shared with any of the snapshots and thus can be deallocated.

4. The method of claim 3, wherein the file being truncated stores a primary storage object and the files storing snapshots store snapshot images of the primary storage object.

5. The method of claim 3, wherein the file being truncated is a file storing a snapshot image of a primary storage object stored in another file.

6. The method of claim 1, wherein the truncation operation is performed in connection with deletion of the file, the truncation operation truncating the file to a size of zero.

7. The method of claim 1, wherein a heuristic is used for pacing the background update, the heuristic employing factors selected from CPU utilization, I/O latency, and number of client I/Os.

8. The method of claim 1, wherein initiating the background update includes:
    during a first time period, adjusting the paced rate, which permits initiation of new file system operations before all of the truncated blocks have been deallocated, to a first selected rate of deallocating truncated blocks of the file, and
    during a second time period after the first time period, adjusting the paced rate, which permits initiation of new file system operations before all of the truncated blocks have been deallocated, to a second selected rate of deallocating truncated blocks of the file, the second selected rate being faster than the first selected rate to accelerate deallocation of truncated blocks of the file in response to an increase in demand for free space.

9. A data storage system, comprising:
    physical storage devices;
    respective interfaces to the physical storage devices and to a network via which client storage requests are received; and
    one or more storage processors coupled to the physical storage devices and to the network via the respective interfaces, the storage processors configured and operative to perform a method including:
        operating an internal file system using the physical storage devices for underlying data storage, the internal file system storing client storage objects as respective files of the file system, the file system including allocated space occupied by existing file data and free space available for storing new file data;
        maintaining respective counts of actual free space and reported free space of the file system, the actual free space including blocks currently available for allocation to store new file data, the reported free space including the actual free space as well as blocks of recently deleted file data undergoing deallocation, the count of reported free space being used to initiate file system operations requiring allocation of free space, the count of actual free space being used to continue initiated file system operations based on availability of actual free space; and
        upon truncation of a file, performing a reporting update and initiating a background update, the reporting update either estimating or counting a number of blocks to be freed by the truncation and adding the number to the reported free space for use in initiating subsequent file system operations requiring allocation of free space, the background update deallocating truncated blocks of the file and updating the count of actual free space as the truncated blocks are deallocated, the background update being performed at a paced rate permitting initiation of new file system operations before all the truncated blocks have been deallocated.

10. The data storage system of claim 9, wherein the method further includes, during an initiated file system operation requiring allocation of an amount of free space greater than the actual free space, (i) temporarily suspending the file system operation and de-pacing the background update to hasten the deallocation of the truncated blocks, and (ii) upon the count of actual free space reaching a desired higher value by the deallocation of the truncated blocks, resuming the file system operation.

11. The data storage system of claim 9, wherein the file system includes files storing snapshots of the file being truncated, and wherein estimating a number of blocks to be freed by the truncation includes evaluating metadata of the file to determine the number of file system blocks that are uniquely allocated to the file, indicating that such file system blocks are not shared with any of the snapshots and thus can be deallocated.

12. The data storage system of claim 11, wherein the file being truncated stores a primary storage object and the files storing snapshots store snapshot images of the primary storage object.

13. The data storage system of claim 11, wherein the file being truncated is a file storing a snapshot image of a primary storage object stored in another file.

14. The data storage system of claim 9, wherein the truncation operation is performed in connection with deletion of the file, the truncation operation truncating the file to a size of zero.

15. The data storage system of claim 9, wherein a heuristic is used for pacing the background update, the heuristic employing factors selected from CPU utilization, I/O latency, and number of client I/Os.

16. A non-transitory computer-readable medium storing computer program instructions, the instructions being executable by a set of one or more storage processors of a data storage system to cause the data storage system to perform a method including:

operating an internal file system using physical storage devices of the data storage system for underlying data storage, the internal file system storing client storage objects as respective files of the file system, the file system including allocated space occupied by existing file data and free space available for storing new file data;

maintaining respective counts of actual free space and reported free space of the file system, the actual free space including blocks currently available for allocation to store new file data, the reported free space including the actual free space as well as blocks of recently deleted file data undergoing deallocation, the count of reported free space being used to initiate file system operations requiring allocation of free space, the count of actual free space being used to continue initiated file system operations based on availability of actual free space; and upon truncation of a file, performing a reporting update and initiating a background update, the reporting update either estimating or counting a number of blocks to be freed by the truncation and adding the number to the reported free space for use in initiating subsequent file system operations requiring allocation of free space, the background update deallocating truncated blocks of the file and updating the count of actual free space as the truncated blocks are deallocated, the background update being performed at a paced rate permitting initiation of new file system operations before all the truncated blocks have been deallocated.

17. The non-transitory computer-readable medium of claim 16, wherein the method further includes, during an initiated file system operation requiring allocation of an amount of free space greater than the actual free space, (i) temporarily suspending the file system operation and de-pacing the background update to hasten the deallocation of the truncated blocks, and (ii) upon the count of actual free space reaching a desired higher value by the deallocation of the truncated blocks, resuming the file system operation.

18. The non-transitory computer-readable medium of claim 16, wherein the file system includes files storing snapshots of the file being truncated, and wherein estimating a number of blocks to be freed by the truncation includes evaluating metadata of the file to determine the number of file system blocks that are uniquely allocated to the file, indicating that such file system blocks are not shared with any of the snapshots and thus can be deallocated.

19. The non-transitory computer-readable medium of claim 18, wherein the file being truncated stores a primary storage object and the files storing snapshots store snapshot images of the primary storage object.

20. The non-transitory computer-readable medium of claim 18, wherein the file being truncated is a file storing a snapshot image of a primary storage object stored in another file.

21. The non-transitory computer-readable medium of claim 16, wherein a heuristic is used for pacing the background update, the heuristic employing factors selected from CPU utilization, I/O latency, and number of client I/Os.

* * * * *